UNITED STATES PATENT OFFICE 2,575,168

RODENTICIDE COMPRISING 4-AMINO-PTEROYLGLUTAMIC ACID

Alfred L. Franklin, Pearl River, N. Y., assignor to American Cyanamid Company, New York, N. Y., a corporation of Maine No Drawing. Application July 22, 1948, Serial No. 40,160

2 Claims. (Cl. 167—46)

The present invention relates to a novel poison for the group of mammals known as rodents, and to methods of using the same.

It has long been recognised by those concerned with the problem of eradicating rodents, particularly rats and mice, that the use of poisonous baits is a feasible method of extermination. Although many compounds have been suggested and used as the poisonous constituent of baits, most of them have disadvantages which hinder widespread success. For instance, alkaloids, such as strychnine, mixed with corn or other rodent foods are often used. However, due to their bitter taste the rodents do not readily take these poisons.

It has now been discovered that 4-aminopteroylglutamic acid is highly lethal to rodents and is an unusually effective rodenticide when mixed with edible carriers.

4-aminopteroylglutamic acid represented by the formula:

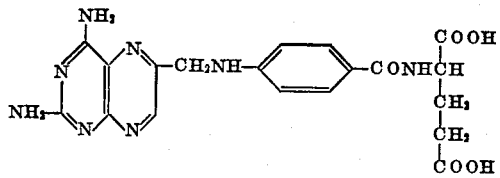

may be prepared by the method disclosed in the following example in which the parts are by weight.

2.7 parts of 2,4,5,6-tetraaminopyrimidine sulfate and 2.4 parts of barium chloride ($BaCl_2.2H_2O$) are slurried with 60 parts of water at 60° C. for 10 minutes. After cooling to 45° C., 1.33 parts of p-aminobenzoylglutamic acid are added, and the pH is adjusted to 3, with caustic soda. The following solutions are then added simultaneously during 10 minutes: 2.2 parts of dibromopropionaldehyde dissolved in acetic acid; 1.3 parts of iodine and 2.5 parts of potassium iodide in 8 parts of water; and caustic soda to maintain the pH at 3. Agitation is continued at the same temperature and pH for an additional 30 minutes, after which the slurry is cooled and filtered, and the product on the filter is washed with water and ethanol. The crude product, a brown amorphous material, may be purified by known methods or, if desired, may be incorporated as such in rodent-edible foods.

4-aminopteroylglutamic acid seems to have no taste or odor that is detectable by the rodent, and may be used by incorporating it into a bait at a very low concentration. There is a considerable delay between the ingestion of the compound and the death of the rodent, usually about 2 or 3 days. The L. D.$_{50}$ of the compound (administered in the feed) for mice is approximately 50 micrograms per kilogram of body weight.

Typical data illustrating the remarkable rodenticidal activity of the compound are listed in the table below. Six adult male white mice were used per group. The animals were fed ground corn containing 4-aminopteroylglutamic acid as indicated. The "feeding interval" means that the mice were allowed to feed on the poisoned food for the specified number of hours and thereafter were fed a normal diet.

| 4-aminopteroylglutamic acid Mg./Kg. diet | Feeding Interval, Hours | Survival Period, Days [1] |
|---|---|---|
| 10 | 4 | 3, 3, 7+, 7+, 7+, 7+ |
| 100 | 4 | 2, 3, 3, 3, 7+ |
| 1,000 | 4 | 3, 3, 3, 3, 3, 3 |
| .1 | 24 | 3, 3, 3, 4, 7+, 7+ |
| 10 | 24 | 2, 3, 3, 3, 3, 4 |
| 100 | 24 | 2, 3, 3, 3, 3, 3 |
| 1,000 | 24 | 1, 2, 3, 3, 3, 3 |

[1] Animals surviving the period of observation (7 days) are indicated 7+.

A bait of rodent-edible food containing one milligram of 4-aminopteroylglutamic acid per kilogram of diet when fed to a group of weanling white mice gave a 100% kill during a period of one week. Similar results were obtained with weanling male albino rats feeding on a bait containing 10 milligrams of 4-aminopteroylglutamic acid per kilogram of diet.

Inasmuch as 4-aminopteroylglutamic acid does not have an objectionable odor or taste, it is particularly suited for incorporating in edible carriers for the rodents which do not appear to either detect the presence of the poison or do not object to it if they do detect it. The compound can be utilized in a variety of baits such as ground meat, ground wheat, corn, and the like. It may also be employed in dusts with diluents such as talc, diatomaceous earth, pyrophyllite, bentonite, etc., and utilized as a "tracking poison," that is to say, the rodent collects the dust on its feet and later licks them upon entering its nest.

While the invention has been described with particular reference to specific embodiments, it is to be understood that it is not to be limited thereto but is to be construed broadly and restricted solely by the scope of the appended claims.

I claim:

1. A rodenticide including as its active ingredient 4-aminopteroylglutamic acid, and a rodent edible dispersion medium therefor.

2. The composition of claim 1 in which the dispersion medium is a rodent-edible food.

ALFRED L. FRANKLIN.

REFERENCES CITED

The following references are of record in the file of this patent:

UNITED STATES PATENTS

| Number | Name | Date |
| --- | --- | --- |
| 222,413 | Lyons et al. | Dec. 9, 1879 |
| 2,390,848 | Richter | Dec. 11, 1945 |

OTHER REFERENCES

Lederle Bulletin, vol. XIII, No. 3, April 1948, p. 21.

Seeger et al., J. A. C. S., vol. 69, pages 2567, October 1947.